(12) United States Patent
Singh (10) Patent No.: US 12,210,433 B2
(45) Date of Patent: Jan. 28, 2025

(54) SYSTEMS AND METHODS FOR AUTOMATICALLY TRIGGERING QUALITY EVENT FILINGS

(71) Applicant: Honeywell International Inc., Charlotte, NC (US)

(72) Inventor: Ankit Singh, Apex, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 223 days.

(21) Appl. No.: 18/066,646

(22) Filed: Dec. 15, 2022

(65) Prior Publication Data
US 2024/0202091 A1 Jun. 20, 2024

(51) Int. Cl.
*G06F 11/30* (2006.01)
(52) U.S. Cl.
CPC ...... *G06F 11/3058* (2013.01); *G06F 2201/86* (2013.01)
(58) Field of Classification Search
CPC .......................... G06F 11/3058; G06F 2201/86
See application file for complete search history.

(56) References Cited

U.S. PATENT DOCUMENTS

| 2010/0274632 A1* | 10/2010 | Pullin ................ G06Q 30/0282 705/347 |
| 2012/0254048 A1* | 10/2012 | Roberts .............. G06Q 10/0637 705/317 |
| 2020/0117690 A1* | 4/2020 | Tran .................. G06F 16/90332 |
| 2022/0299492 A1* | 9/2022 | Sawadogo ............... F24F 11/63 |
| 2023/0004666 A1* | 1/2023 | Beagle ................ G06V 20/625 |
| 2024/0054245 A1* | 2/2024 | Van Dyne ........... G06F 16/2457 |

FOREIGN PATENT DOCUMENTS

EP 2784733 A1 * 10/2014 ............. G06Q 10/08

* cited by examiner

*Primary Examiner* — Joseph O Schell
*Assistant Examiner* — Indranil Chowdhury
(74) *Attorney, Agent, or Firm* — ALSTON & BIRD LLP (57) ABSTRACT

A system and method is disclosed for automatically triggering a quality event filing in a monitored area, comprising: receiving incoming data from a plurality of connected devices in the monitored area, the incoming data including environmental data of the monitored area and user data of at least one user in the monitored area; determining, by the at least one processor, whether the incoming data is indicative of the occurrence of at least one quality event in the monitored area; and upon a determination that the incoming data is indicative of at least one quality event, generating, by the at least one processor, a quality event form with form data pre-filled, and transmitting the quality event form to a graphical user interface of a user device of at least one user in the monitored area.

20 Claims, 5 Drawing Sheets

SYSTEMS AND METHODS FOR AUTOMATICALLY TRIGGERING QUALITY EVENT FILINGS

TECHNICAL FIELD

The present disclosure relates generally to systems and methods for auto triggering quality event filings, and more specifically to integrating connected beacons with a quality management solution mobile application to relay information about quality events to specified users for the filing of quality events.

BACKGROUND

Quality management tools have been developed to monitor quality events in a variety of business and industrial environments, such as warehouse facilities, business offices, and pharmaceutical or life sciences laboratories. A critical aspect of these tools is that users report quality events so that the quality management tools have a log of events. However, users may find the starting of a quality event a laborious task because they have to fill out a form that is quite extensive and manually enter substantial amounts of information in various fields in forms. Furthermore, manual entry risks user error in data entry, errors that may be reduced if an intelligent computer system were to at least partially prepare the quality event forms.

Beacons, sensors, and other devices may be used to monitor the factors that may lead to quality events, such as temperature and humidity of a laboratory, or a technician's training program. In addition to alerting users of a potential quality event situation, these devices may be integrated with a user device via a networked system to deliver a pre-filled quality event report to the user for review and submission, alleviating the above-identified problems.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for automatically triggering a quality event filing in a monitored area.

In one aspect, an exemplary embodiment includes a computer-implemented method for automatically triggering a quality event filing in a monitored area, the method comprising: receiving, by at least one processor, incoming data from a plurality of connected devices in the monitored area, the incoming data including environmental data of the monitored area and user data of at least one user in the monitored area; determining, by the at least one processor, whether the incoming data is indicative of an occurrence of at least one quality event in the monitored area by referencing the incoming data with parameters stored in a database; upon a determination that the incoming data is indicative of the occurrence of at least one quality event, generating, by the at least one processor, a quality event form with one more sections that correspond to the incoming data pre-filled, and transmitting the quality event form to a graphical user interface of a user device of the at least one user in the monitored area; receiving, by the at least one processor, an updated quality event form from the user device, the updated quality event form including the user data of the at least one user in the monitored area; and transmitting, by the at least one processor, the updated quality event form to the database.

In a further aspect, a computer system is disclosed for automatically triggering a quality event filing in a monitored area, the computer system comprising: at least one memory having processor-readable instructions stored therein; and at least one processor configured to access the memory and execute the processor-readable instructions, which when executed by the at least one processor configured the processor to perform a plurality of functions, including functions for: receiving, by at least one processor, incoming data from a plurality of connected devices in the monitored area, the incoming data including environmental data of the monitored area and user data of at least one user in the monitored area; determining, by the at least one processor, whether the incoming data is indicative of an occurrence of at least one quality event in the monitored area by referencing the incoming data with parameters stored in a database; upon a determination that the incoming data is indicative of the occurrence of at least one quality event, generating, by the at least one processor, a quality event form with one more sections that correspond to the incoming data pre-filled, and transmitting the quality event form to a graphical user interface of a user device of the at least one user in the monitored area; receiving, by the at least one processor, an updated quality event form from the user device, the updated quality event form including the user data of the at least one user in the monitored area; and transmitting, by the at least one processor, the updated quality event form to the database.

In another aspect, a non-transitory computer-readable medium is disclosed containing instructions for automatically triggering a quality event filing in a monitored area, the non-transitory computer-readable medium storing instructions that, when executed by at least one processor, configure the at least one processor to perform: receiving, by at least one processor, incoming data from a plurality of connected devices in the monitored area, the incoming data including environmental data of the monitored area and user data of at least one user in the monitored area; determining, by the at least one processor, whether the incoming data is indicative of an occurrence of at least one quality event in the monitored area by referencing the incoming data with parameters stored in a database; upon a determination that the incoming data is indicative of the occurrence of at least one quality event, generating, by the at least one processor, a quality event form with one more sections that correspond to the incoming data pre-filled, and transmitting the quality event form to a graphical user interface of a user device of the at least one user in the monitored area; receiving, by the at least one processor, an updated quality event form from the user device, the updated quality event form including the user data of the at least one user in the monitored area; and transmitting, by the at least one processor, the updated quality event form to the database.

To the accomplishment of the foregoing and related ends, certain illustrative aspects are described herein in connection with the following description and the appended drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

Embodiments of the disclosure will now be described, by way of example only, with reference to the accompanying drawings in which.

DETAILED DESCRIPTION

According to certain aspects of the disclosure, methods and systems are disclosed for auto triggering quality event filings, and more specifically for integrating connected beacons with a quality management solution mobile application to relay information about quality events to specified users for the filing of quality events.

Quality management tools are available to help monitor, log, and improve operations at business and industrial sites. A key aspect of quality management tools is that quality events, such as complaints, preventive actions, corrective actions, or new training assignments, are logged quickly and efficiently. Manual logging of quality events can be time-consuming, cumbersome, and prone to user error. Quality event filing would be improved if the process can be at least partially automated. One way of achieving this is to provide a mobile application or other user interface that connects with beacons that monitor the site and trigger quality events.

Beacons may be installed at a variety of business or industrial sites, such as on the manufacturing floor, laboratory areas, and packaging and shipping locations for the pharmaceutical and life sciences industry. The beacons which are installed at these various locations can send information about events like chemical spills, high room temperatures, humid conditions, employees with missing trainings, and other events that should be logged as a quality event. Subsequently, users who carry a mobile device in these locations (employees of Life Sciences companies) may receive a beacon triggered message that auto fills the correct quality event automatically in the QMS app alleviating the cumbersome quality event filing process and auto-filling important details that a human user may enter incorrectly.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). Furthermore, the method presented in the drawings and the specification is not to be construed as limiting the order in which the individual steps may be performed. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" or "in some embodiments" as used herein does not necessarily refer to a different embodiment. It is intended, for example, that claimed subject matter include combinations of exemplary embodiments in whole or in part.

Figure 1:
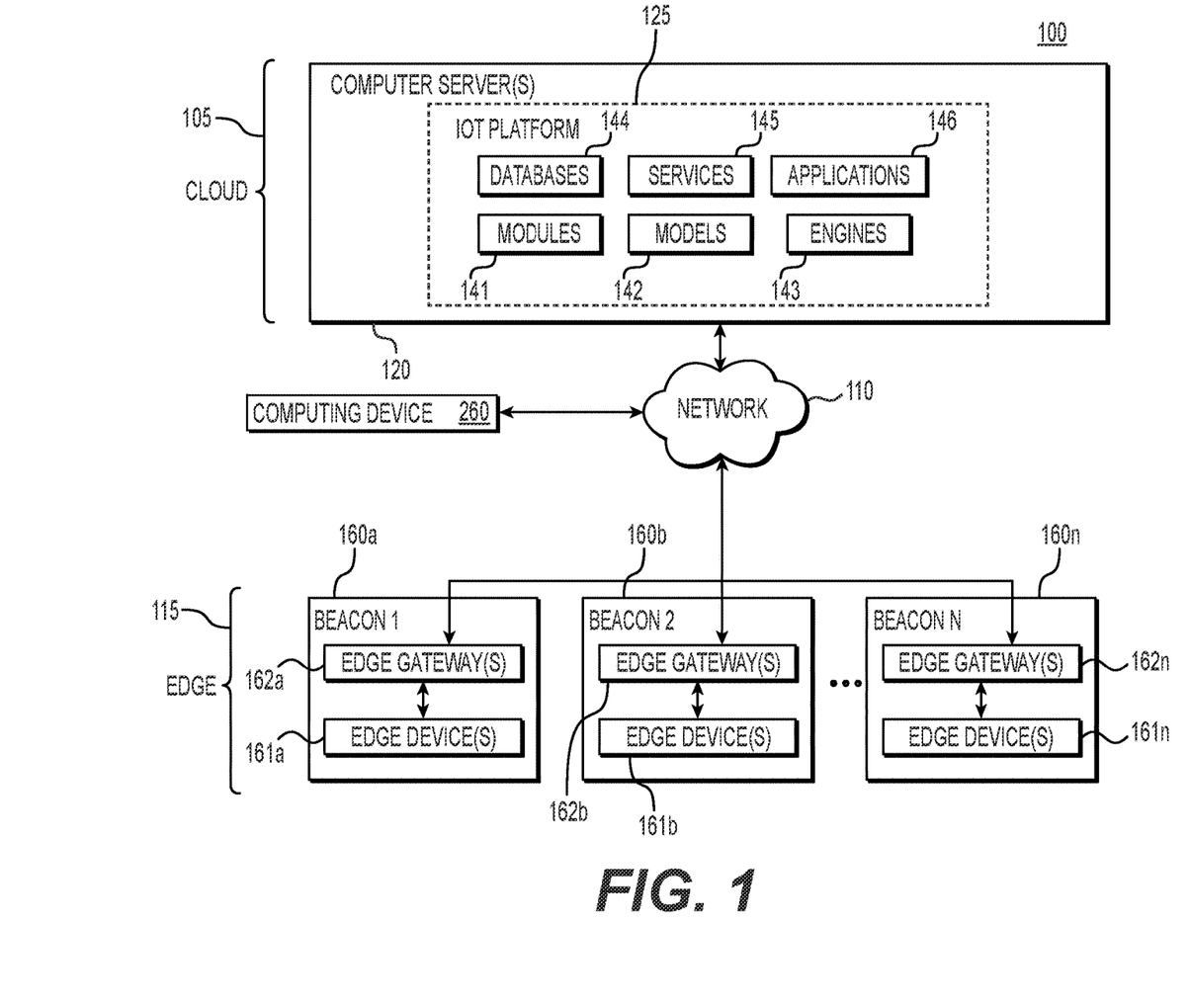
FIG. 1 illustrates an exemplary networked computing system environment, in accordance with one or more embodiments described herein.

FIG. 1 illustrates an exemplary networked computing system environment 100 for auto triggering quality event filings, according to the present disclosure. As shown in FIG. 1, networked computing system environment 100 is organized into a plurality of layers including a cloud 105, a network 110, and an edge 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/or virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory). According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more beacons 160a-160n each including one or more edge devices 161a-161n and one or more edge gateways 162a-162n. For example, a first beacon 160a includes first edge devices 161a and first edge gateways 162a, a second beacon 160b includes second edge devices 161b and second edge gateways 162b, and an nth beacon 160n includes nth edge devices 161n and nth edge gateways 162n.

According to various embodiments, the edge devices 161a-161n represent any of a variety of different types of devices that may be found within the beacons 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, vehicle components, cameras, displays, doors, windows, security components, laboratory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. In some cases, any of edge devices 161a-n and edge gateways 162a-n have their functionality combined, omitted, or separated into any combination of devices. In other words, an edge device and its gateway need not necessarily be discrete devices.

The modules 141 may include an API module, a reporting services module, a data storage module, an identity management module, a data transformation module, an audit trail/logging module, a domain models module, a permissions module, and/or a data retention module. The various modules may provide data to a connector framework for sending the processed data to one or more databases 144.

The APIs module may provide one or more users (e.g., the systems administrator, the business administrator, etc.) and/or developers with one or more tools (e.g., wizards, UIs, etc.) to design, test, implement, deploy, and manage APIs for use across the environment 100. A user can create one or more intermediaries (e.g., software applications) that may make it possible to read, convert, present, use, manipulate, or otherwise access the data on the systems 120 for presentation or other use in a generated product. The APIs module may be cloud-based and/or locally accessible by one or more users (e.g., the systems administrator, the business administrator, etc.).

The APIs module may be used to allow one or more programs and/or computer systems within the network 110 to communicate with one another. In some embodiments, the APIs module may include an API specification, which may describe how to build and/or use one or more of the APIs built using the API module within the network 110. The APIs module may include one or more subroutines, methods, requests, or endpoints that may be tools used to program the one or more APIs. The APIs module may be used to generate one or more APIs for specific reports.

In some embodiments, the APIs module may be used to build one or more web APIs, which may allow communication between one or more computers or computer systems that may connect the network 110 with another external network (e.g., the Internet). In some embodiments, the web APIs may allow access to one or more computers or computer systems communicatively coupled to the network 110 through one or more client devices (E.g., mobile phones, laptops, etc.). Such devices may connect to the network using, for example, the hypertext transfer protocol (HTTP). These client devices may send a request in the form of an HTTP request. The request may be met with a response message in a different format (e.g., JavaScript Object Notation (JSON), and/or extensible markup language (XML), etc.) In some embodiments, one or more users may use a web API (e.g., a web API created by the APIs module 110) to query the one or more databases 144 for a specific set of data.

The reporting services module may aggregate usage information for various aspects (e.g., files, data, etc.) and may report the usage information to one or more of the various interconnected systems or modules (e.g., the APIs module, the network 110, etc.). For example, if a particular file or data is accessed and/or used, the reporting services module may aggregate data regarding the use of that particular information and report it to one or more internal modules or external systems. The reporting services module may further generate information regarding, for example, statistical information on the amount of usage of components of the system 100.

The data storage module may include one or more storage drives configured to retrieve stored data in response to one or more storage commands received from the system 100 (e.g., from the system admin). The data storage module may include hardware and software components, for example, the data storage module may include a plurality of storage drives (e.g., solid state drives) that may be configured to store and retrieve data in response to storage instructions. Portions of the storage module may be implemented using software modules, such as drivers, services, and/or the like. Other portions of the storage module may be implemented using hardware resources, such as FPGAs, processors, ASICS, hardware controllers, storage controllers, and the like.

The identity management module may provide identity services, such as access management and authorization services, to the network 110. The identify management module may control information about tenants and clients that may utilize the services provided by the system 100. Information used and generated by the identity management module may include authenticating information that identifies users and assigns the users appropriate authorizations for particular system resources. In some embodiments, the identity management module may include a framework of policies and technologies that may safeguard the network 110 such that the correct users (e.g., that are part of the ecosystem connected to the network 110) have the appropriate access to the appropriate resources. The identity management module may enable users to create and/or gain an identity within the ecosystem, assign the created/gained users or other users one or more roles within the ecosystem, and may assign permissions and/or identity grants to the users. The identity management module may store and make available the identities and the technologies supporting that protection (e.g., network protocols, digital certificates, passwords, etc.).

The identity management module may serve various functions throughout multiple stages of a user's interaction with the network 110. For example, during a registration phase, the identity management module may register and authorize access rights. During an operations phase, the identity management module may continuously identify, authenticate, and control the individual identities and/or groups of identities with access to the various hardware and/or software systems of the network 110. The identity management module may serve, for example, five basic functions: pure identity, user access (e.g., log-on), presence-based services, identity federation, and audit function. In some embodiments, the identity management module may be communicatively coupled with one or more external identity management systems that may perform one or more of the functions of the identity management module.

The data transformation module may be configured to transform, convert, and/or translate data acquired from the beacons 160a-n. The transformation module may be configured to parse data structures acquired from the beacons a-n and to transform the data into a format that is compatible for use with one or more other components of the system 100 (e.g., one or more other modules or for storage in a database). The system 120 may comprise multiple data transformation modules, where each module may be configured to transform data from one or more of the individual beacons a-n. The data transformation module may receive a user query and retrieve and transform unstructured or structured data.

The audit trail/logging module may be configured to track, in real time, a request for identity verification and any response from any of the various users of the system 100. In some embodiments, the audit trail/logging module may be configured to track or monitor services performed by various users of the system and by the various components of the system (e.g., one or more servers). The audit trail/logging module may be configured to record a detailed log of actions and events which occur within the system 100. As a result, the system administrator or other user may identify and locate sources of error.

The permissions module may be configured to determine whether a user is authorized to access certain information and/or to perform a particular action within the system 100. The permissions module may query permissions data stored in the system 100. The stored data may indicate required permissions associated with various actions or settings. Users may have varying levels of permission based on different actions/information. The permissions module may access and analyze identity information for particular users to determine an identity of a user. For example, the permissions module may determine permissions of a user based at least in part on the identity of the user.

The data retention module may be configured to detect a data retention triggering event and to initiate one or more data retention. For example, data may be retained in the memory using one or more sets of write parameter values. In some embodiments, the data retention module may be configured to delete all stored data in response to a triggering event. For example, all of a client's stored data may be deleted upon completion and delivery of a report. The data retention module may be configured to initiate an autonomous storage operation or to create sufficient storage space for a particular operation. For example, the data retention module may cause data from the beacons 160a-n to be stored in a local module within the system 120 for later processing and manipulation (e.g., during report generation).

Figure 2:
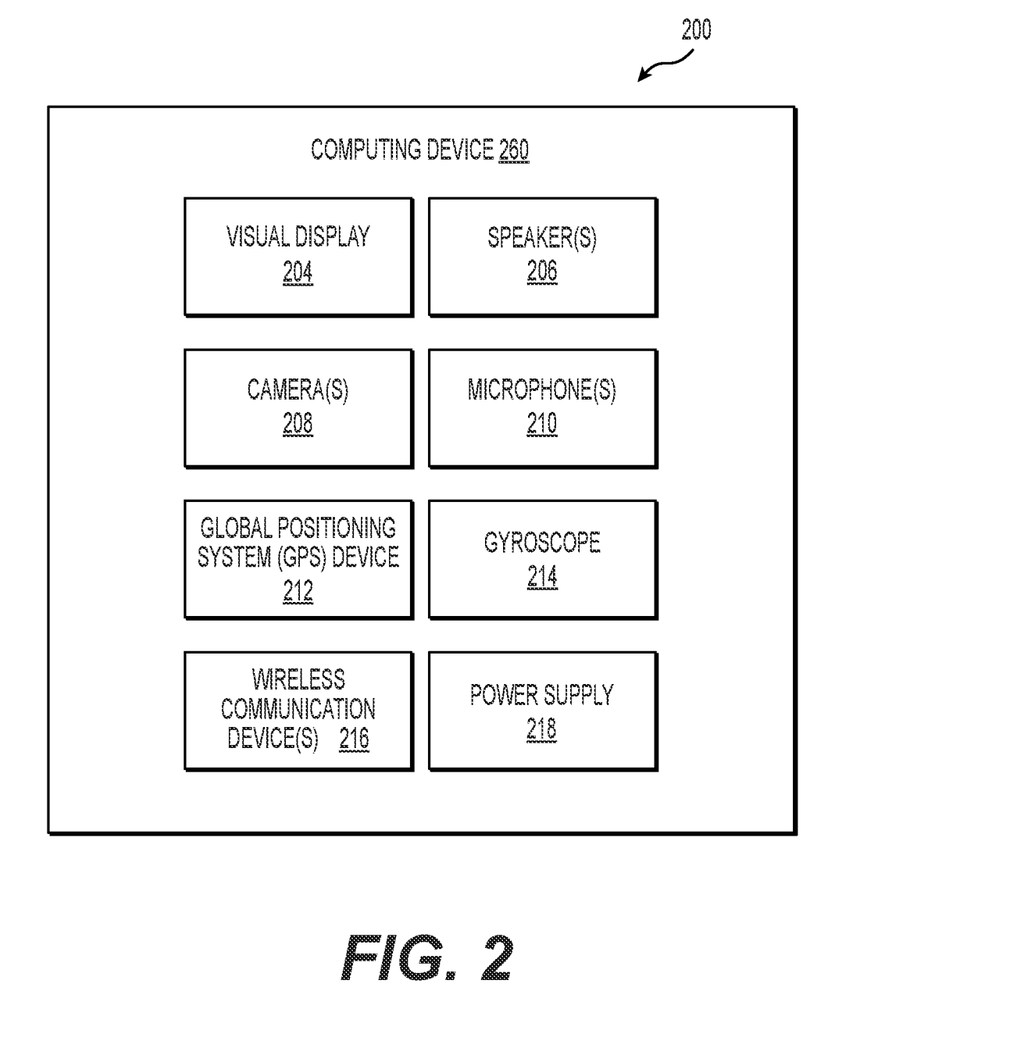
FIG. 2 illustrates an exemplary computing device, in accordance with one or more embodiments described herein.

Referring to FIG. 2, the computing device 260 is shown in greater detail. The computing device 260 may include a visual display 204, one or more speakers 206, one or more cameras 208, one or more microphones 210, a global positioning system (GPS) device 212, a gyroscope 214, one or more wireless communication devices 216, and/or a power supply 218.

In an embodiment, the visual display 204 is a display that facilitates presentation and/or interaction with one or more portions of visualization and/or data delivered to the computing device 260 via network 110 from one or more of the beacons 160a-n or from a module of the computer system 120 in cloud 105. In one or more embodiments, the computing device 260 displays an electronic interface (e.g., a graphical user interface) associated with a QMS platform, which may include a mobile application running on a mobile operating system, where computing device 260 is a mobile device. In one or more embodiments, the visual display 204 is a visual display that renders one or more interactive media elements via a set of pixels. The one or more speakers 206 include one or more integrated speakers that project audio. The one or more cameras 208 include one or more cameras that employ autofocus and/or image stabilization for photo capture and/or real-time video. The one or more microphones 210 include one or more digital microphones that employ active noise cancellation to capture audio data. In one or more embodiments, at least a portion of the voice input is generated via the one or more microphones 210. The GPS device 212 provides a geographic location for the computing device 360. The gyroscope 214 provides an orientation for the computing device 360. The one or more wireless communication devices 216 includes one or more hardware components to provide wireless communication via one or more wireless networking technologies and/or one or more short-wavelength wireless technologies. The power supply 218 is, for example, a power supply and/or a rechargeable battery that provides power to the visual display 204, the one or more speakers 206, the one or more cameras 208, the one or more microphones 210, the GPS device 212, the gyroscope 214, and/or the one or more wireless communication devices 216. In certain embodiments, the dashboard visualization data 322 associated with the one or more metrics, the prioritized actions and/or the one or more asset insights related to the portfolio of assets is presented via the visual display 204 and/or the one or more speakers 206.

Figure 3:
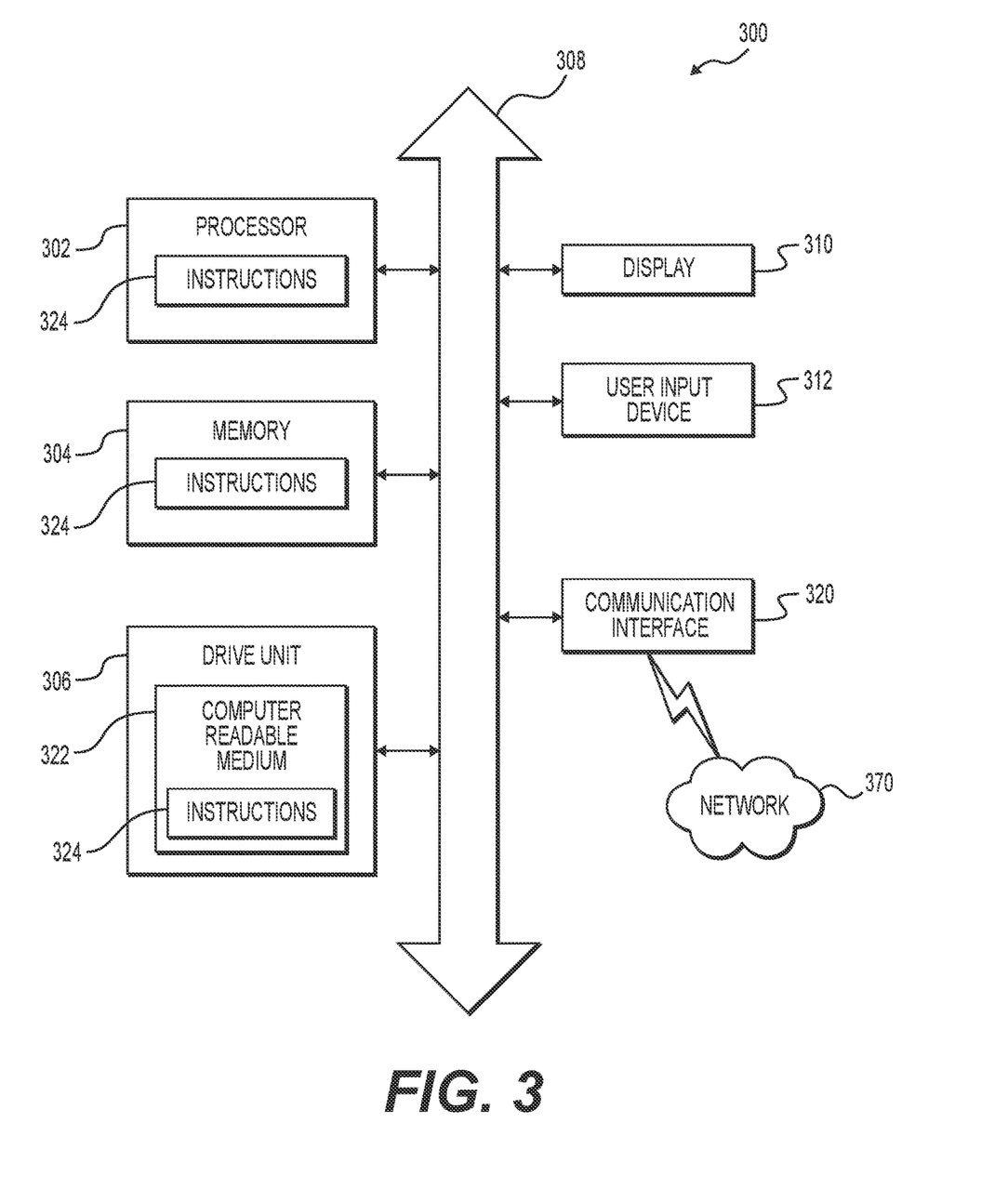
FIG. 3 depicts an implementation of a controller that may execute techniques presented herein, according to one or more embodiments.

FIG. 3 depicts an implementation of a controller 300 that may execute techniques presented herein, according to one or more embodiments. The controller 300 may include a set of instructions that can be executed to cause the controller 300 to perform any one or more of the methods or computer based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
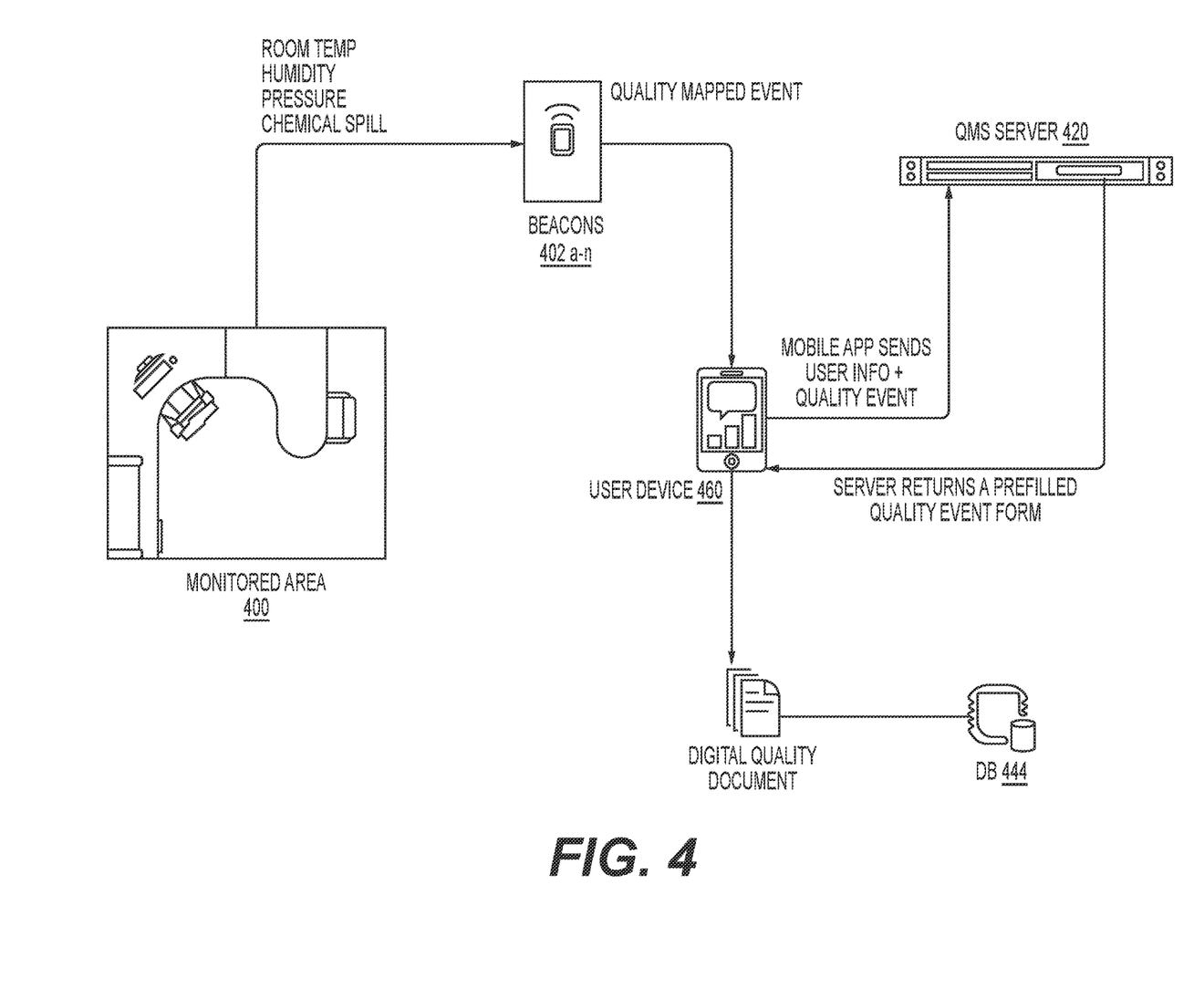
FIG. 4 depicts a simplified diagrammatic view of a system for integrating beacons with a QMS user device for auto triggering quality events, according to one or more embodiments.

FIG. 4 depicts a simplified diagrammatic view of a system for integrating beacons with a QMS user device for auto triggering quality events. A monitored area 400 may be equipped with a variety of beacons 402a-n, that may be designed to monitor environmental factors such as room temperature, humidity, pressure, etc., sensors designed to identify specific events such as chemical spills, gas leaks, smoke or carbon monoxide accumulation, etc., and/or devices designed to identify users as they enter or exit the monitored area, among other devices. The monitored area may be a life sciences laboratory, a pharmaceutical floor, a shipping and/or manufacturing area, or any other business or industrial environment. There may be dedicated beacons 402a-n for each monitored factor (e.g., one beacon dedicated to monitoring temperature, one beacon dedicated to monitoring humidity, one beacon dedicated to tracking users, etc.), or a single beacon 402 incorporating all of the functionality of the individual beacons 402a-n.

Each of the one or more beacons 402a-n may be a combined IoT device with IoT gateway with the capabilities of the beacons 160a-n described in FIG. 1. Notably, each beacon 402a-n is configured to access network 110 and communicate with cloud 105, or be accessed by other devices through network 110 for collecting, sending, and/or receiving information. Each beacon 402a-n comprises an edge device 161a-n and an edge gateway 162a-n. Each edge device 161a-161n includes, or is otherwise in communication with, one or more controllers for selectively controlling a respective edge device 161a-161n and/or for sending/receiving information between the edge devices 161a-161n and the cloud 105 via network 110.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

In one or more embodiments, the edge gateways 162a-162n are configured to receive data from the edge devices 161a-161n and process the data prior to sending the data to QMS server 420, which may be on the cloud 105 or on the premises. Accordingly, in one or more embodiments, the edge gateways 162a-162n include one or more software modules or components for providing data processing services and/or other services or methods of the present disclosure. In some cases, any of beacons 402a-n have their functionality combined, omitted, or separated into any combination of devices.

The beacons 402a-n may communicate with the QMS server 420, or communicate directly with a user device 460. The user device 460 may include a dedicated mobile application that communicates with QMS server 420 to log in and authenticate a user upon the user's entry into the monitored area. The QMS server 420, consistent with IoT computer system 120 described with reference to FIG. 1, includes at least a reporting services module, a data storage module, an identity management module, a data transformation module, an audit trail/logging module, a permissions module, and a data retention module. These modules will ascertain that the user device 460 belongs to an authenticated user that has permission to access the information provided in a pre-filled quality event filing and to review and submit the quality event filing after receiving the pre-filled form. An RFID scanner, a biometric scanner, or other user authentication method may be installed to automatically identify that a user has entered the room, and transmit this information through the mobile application on the user device 460 or via one or more of the beacons 402a-n to the QMS server 420, which may provide to the beacons the user identity and permissions. When one or more of the beacons 402a-n identifies a triggering event, the information will only be sent to the user if the user has permission to access that information.

In one embodiment, the beacons 402a-n regularly transmit environmental conditions and information about identified users in the area to the mobile device 460, and the mobile device 460 includes a mobile application or other dedicated software that may determine whether the information sent by beacons 402a-n constitutes an occurrence of a quality event. If a determination is made that the information constitutes a quality event, the mobile application may send to the QMS server 420 the indication of a quality event and information about the user in possession of the user device 460. The server 420 may return a prefilled quality event form 410 to the user device 460 after running the information provided through the dedicated modules to confirm the triggering of a quality event and the permissions of the user. The user may then finish filling the quality event form 410 inside the mobile application, and submit it to a database 444 that may be stored on the premises, in the QMS server 420, or in the cloud 105 separate from QMS server 420.

The following modules are of particular use in the operation of the invention as described in FIG. 4.

The identity management module may provide identity services, such as access management and authorization services, to the network 110. The identify management module may control information about tenants and clients that may utilize the services provided by the system 100. Information used and generated by the identity management module may include authenticating information that identifies users and assigns the users appropriate authorizations for particular system resources. In some embodiments, the identity management module may include a framework of policies and technologies that may safeguard the network 110 such that the correct users (e.g., that are part of the ecosystem connected to the network 110) have the appropriate access to the appropriate resources. The identity management module may enable users to create and/or gain an identity within the ecosystem, assign the created/gained users or other users one or more roles within the ecosystem, and may assign permissions and/or identity grants to the users. The identity management module may store and make available the identities and the technologies supporting that protection (e.g., network protocols, digital certificates, passwords, etc.).

The identity management module may serve various functions throughout multiple stages of a user's interaction with the network 110. For example, during a registration phase, the identity management module may register and authorize access rights. During an operations phase, the identity management module may continuously identify, authenticate, and control the individual identities and/or groups of identities with access to the various hardware and/or software systems of the network 110. The identity management module may serve, for example, five basic functions: pure identity, user access (e.g., log-on), presence-based services, identity federation, and audit function. In some embodiments, the identity management module may be communicatively coupled with one or more external identity management systems that may perform one or more of the functions of the identity management module.

The audit trail/logging module may be configured to track, in real time, a request for identity verification and any response from any of the various users of the system 100. In some embodiments, the audit trail/logging module may be configured to track or monitor services performed by various users of the system and by the various components of the system (e.g., one or more servers). The audit trail/logging module may be configured to record a detailed log of actions and events which occur within the system 100. The permissions module may be configured to determine whether a user is authorized to access certain information and/or to perform a particular action within the system 100. The permissions module may query permissions data stored in the system 100. The stored data may indicate required permissions associated with various actions or settings. Users may have varying levels of permission based on different actions/information. The permissions module may access and analyze identity information for particular users to determine an identity of a user. For example, the permissions module may determine permissions of a user based at least in part on the identity of the user.

Figure 5:
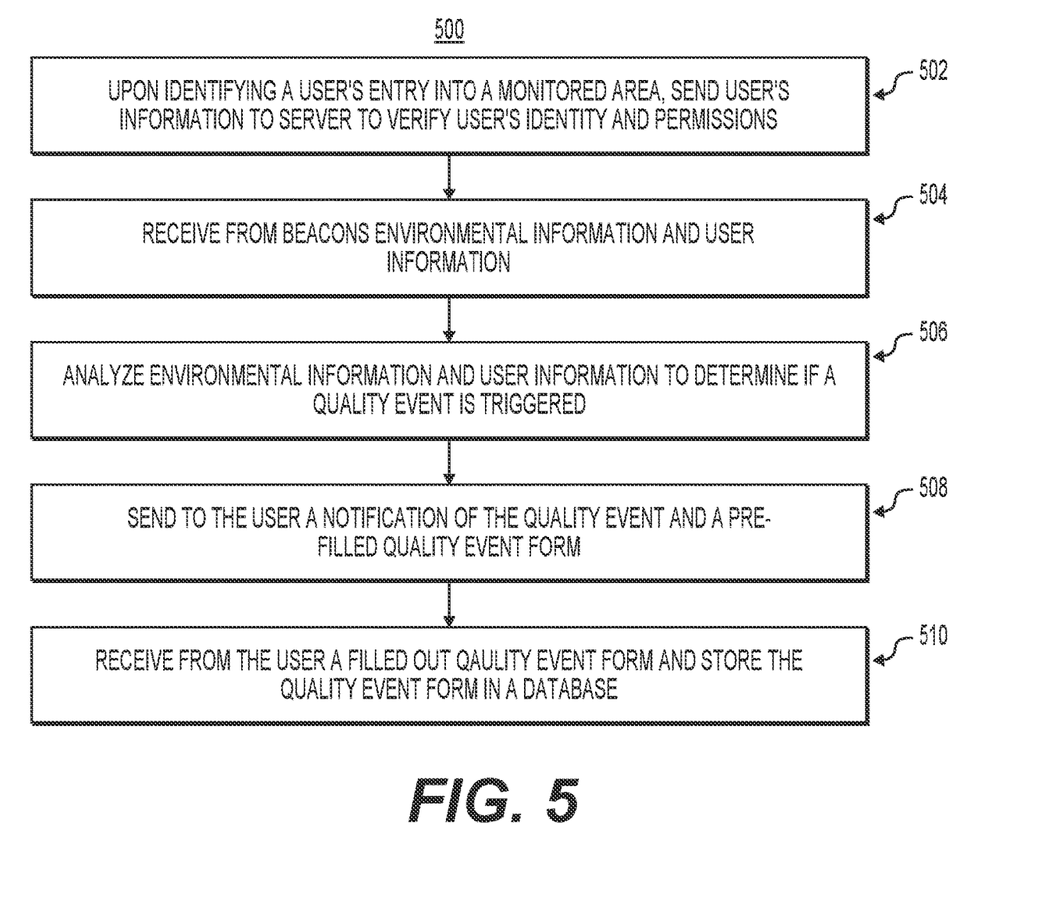
FIG. 5 depicts a flowchart of an exemplary method for automatically triggering quality event filings and providing them to a user, according to one or more embodiments.

Referring to FIG. 5, a method 500 for automatically triggering quality event filings and providing them to a user is shown. It is to be understood that the method for automatically triggering quality event filings and providing them to a user shown in FIG. 5 is exemplary only and that the ordinary artisan in the relevant art will recognize that additional, fewer, or alternate steps may be followed and that any ensuing method may still be in keeping with the scope of the claims below.

At step 502, upon entry into a monitored area 400, a user is identified and authenticated by sending the user's information to QMS server 420 to verify the user's identity and permissions. The monitored area 400 may be equipped with an RFID sensor that may sense a user's badge or other identification, and transmit information about the user to QMS server 420, or may use biometric scanners or other technology to gather information about the identity and permissions of the user. This information is received at QMS server 420 where the identity management module, the audit trail/logging module, and the permissions module are used to determine the identity of the user and their permissions, such that if a quality event is triggered, the QMS server 420 will determine whether the user is authorized to receive and complete the quality event filing.

At step 504, user information and quality event information regarding environmental factors is received at a QMS server 420 and/or on a mobile application on a user device 460.

Environmental factors may include temperature, pressure, humidity, presence of chemicals or other substances, and other factors and are sensed by the beacons 402a-n. The environmental factors monitored by beacons 402a-n are dependent on the context of the monitored area 400 and may be adjusted from one area to another. In one exemplary embodiment, temperature, among other factors, may be monitored by beacons 402a-n where the monitored area 400 is a pharmaceutical laboratory where a drug is being produced that is sensitive to high temperatures. One beacon 402 may include all of the required sensors and memory storage, or the functionality may be distributed onto a plurality of sensors 402a-n. The user information may include context about a user including, for example, authenticating information that identifies users and assigns the users appropriate authorizations for particular system resources. The user information confirms the identity of the user and the user's permissions, and confirms that the user is in the monitored area 400 by associating the user's identification, whether the identification is a badge or a biometric marker, with a beacon 402a-n or RFID sensor associated with the monitored area. In one exemplary embodiment, upon determining that the user has entered the monitored area 400, the beacons 402a-n search the QMS server 420 for information regarding missing trainings for the user.

At step 506, the information received in step 504 is analyze to determine if the information triggers a quality event.

A quality event based on environmental factors may be triggered when one or more of the environmental factors exceeds or falls below a threshold value, or enters or exits a critical range, and these thresholds and ranges are dependent on the particulars of the monitored area 400 and the processes and functions associated therewith. In one exemplary illustration, a quality event may be triggered in a pharmaceutical laboratory where a drug is being produced and the temperature exceeds, for example, 110 degrees F. A technician or skilled artisan may be aware that a temperature this high may cause the process of producing the drug to become compromised, and such information is provided to a database 144 within a QMS server 420, and may be transmitted to a mobile application available on the user device 460. The beacons 402a-n periodically send information regarding the environmental factors to the QMS server 420 and/or the mobile device 460 so that the information regarding the environmental factors may be compared with threshold quality information. Generally, the information may take the form of a numerical value and the step of determining if a quality event is triggered comprises comparing the numerical value to a threshold value. In the exemplary case, when a determination is made at the QMS server 420 or at the user device 460 that the temperature has exceeded the threshold stored in the database 144, e.g. 110 degrees, a quality event is triggered.

In another embodiment, a quality event based on user information may also be triggered in the above example where the QMS server 420 determines that the user is missing a training or has a deadline approaching for a specific training, for example. In one exemplary embodiment, a quality event may be triggered where the user's lack of training in a specific subject or matter may negatively impact the operations of the monitored area 400. In this example, the numerical value of the incoming data may be total number of trainings attended by the user, and the threshold value may be total number of trainings required for the user.

At step 508, a notification of the quality event may be sent to the user device 460 along with a pre-filled quality event form, automatically filling some sections of the form that correspond to relevant information gathered by the beacon or beacons 402*a-n* and incorporated by the QMS server 420. The notification may be sent to the user device 460 and may include a pop-up notification on the user device 460 including information relating to the quality event, and/or a visual cue, an audio or tactile/vibratory alert, or other similar alert on the user device 460. Information that may be included on the quality event form and auto-filled include the date, the location (i.e., the name of the monitored area 400 as it is referenced in the databases of the QMS server 420), the type of quality event (e.g., over-temperature, missing training), and the identity of the user and other relevant information about the user (e.g, title, authorizations), among other information. If the user is determined to be among the personnel that are an authorized user with permission to view and complete the quality event filing, the user may do so and submit the completed form to the QMS server 420 within the mobile application on the user device 460, or by any other means on the user device 460. The user will have the opportunity to correct any information that may have been auto-filled incorrectly, add notes to the filing, fill in any missing information, and electronically sign and date the filing. Optionally, the file may mark any edits the user makes to the auto-filled information and maintain the original information as well. Additionally, in order to ensure proper filing of all quality events, the mobile application may require the user to complete the quality event filing before other functionality returns to the mobile application.

At step 510, the QMS server 420 or an on-premises database 444 receives the completed and updated quality event filing from the user via the user device 460 and stores it in the appropriate database for future reference and action. This may include incorporating into databases 144 or the data storage module for access by the reporting services module, the data transformation module, the data retention module, and/or the audit trail/logging module.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A computer-implemented method for automatically triggering a quality event filing in a monitored area, the method comprising:
   receiving, by at least one processor, incoming data from a plurality of connected devices in the monitored area, the incoming data including environmental data of the monitored area and user data of at least one user in the monitored area;
   determining, by the at least one processor, whether the incoming data is indicative of an occurrence of at least one quality event in the monitored area by referencing the incoming data with parameters stored in a database;
   upon a determination that the incoming data is indicative of the occurrence of at least one quality event, generating, by the at least one processor, a quality event form with one or more sections that correspond to the incoming data pre-filled, and transmitting the quality event form to a graphical user interface of a user device of the at least one user in the monitored area;
   receiving, by the at least one processor, an updated quality event form from the user device, the updated quality event form including the user data of the at least one user in the monitored area; and
   transmitting, by the at least one processor, the updated quality event form to the database.

2. The computer-implemented method of claim 1, further comprising:
   determining, by the at least one processor, whether the at least one user in the monitored area has permission and authorization to receive the environmental data of the monitored area;
   upon a determination that the at least one user has permission and authorization to receive the environmental data, periodically transmitting, by the at least one processor, the environmental data from the connected devices to the graphical user interface of the user device of the at least one user; and
   upon the determination that the incoming data is indicative of at least one quality event transmitting the quality event form to a graphical user interface of the user device of the at least one user in the monitored area.

3. The computer-implemented method of claim 2, wherein determining that the at least one user has permission and authorization comprises referring to an identity management module that controls information about personnel who access the monitored area.

4. The computer-implemented method of claim 1, wherein the environmental data includes at least one of temperature, humidity, and pressure of the monitored area.

5. The computer-implemented method of claim 1, wherein the user data includes training data of the at least one user in the monitored area, further comprising sending a notification, by the at least one processor, to the user device of the at least one user of missing training requirements upon a determination that the at least one user is missing at least one training requirement.

6. The computer-implemented method of claim 1, wherein determining that the incoming data is indicative of the occurrence of at least one quality event in the monitored area is performed by a processor in the user device.

7. The computer-implemented method of claim 1, wherein determining that the incoming data is indicative of the occurrence of at least one quality event in the monitored area comprises:
assigning the incoming data a numerical value, and
comparing the numerical value to a threshold value.

8. The computer-implemented method of claim 1, wherein the user device is a mobile device with a dedicated mobile application on the mobile device, and the quality event form is transmitted to the mobile application on the mobile device.

9. A computer system for automatically triggering a quality event filing in a monitored area, the computer system comprising:
at least one memory having processor-readable instructions stored therein; and
at least one processor configured to access the memory and execute the processor-readable instructions, which when executed by the at least one processor configured the processor to perform a plurality of functions, including functions for:
receiving, by the at least one processor, incoming data from a plurality of connected devices in the monitored area, the incoming data including environmental data of the monitored area and user data of at least one user in the monitored area;
determining, by the at least one processor, whether the incoming data is indicative of an occurrence of at least one quality event in the monitored area by referencing the incoming data with parameters stored in a database;
upon a determination that the incoming data is indicative of the occurrence of at least one quality event, generating, by the at least one processor, a quality event form with one or more sections that correspond to the incoming data pre-filled, and transmitting the quality event form to a graphical user interface of a user device of the at least one user in the monitored area;
receiving, by the at least one processor, an updated quality event form from the user device, the updated quality event form including the user data of the at least one user in the monitored area; and
transmitting, by the at least one processor, the updated quality event form to the database.

10. The computer system of claim 9, further including functions for:
determining, by the at least one processor, whether the at least one user in the monitored area has permission and authorization to receive the environmental data of the monitored area;
upon a determination that the at least one user has permission and authorization to receive the environmental data, periodically transmitting, by the at least one processor, the environmental data from the connected devices to the graphical user interface of the user device of the at least one user; and
upon the determination that the incoming data is indicative of at least one quality event transmitting the quality event form to a graphical user interface of the user device of the at least one user in the monitored area.

11. The computer system of claim 10, wherein determining that the at least one user has permission and authorization comprises referring to an identity management module that controls information about personnel who access the monitored area.

12. The computer system of claim 9, wherein the environmental data includes at least one of temperature, humidity, and pressure of the monitored area.

13. The computer system of claim 9, wherein the user data includes training data of the at least one user in the monitored area, further comprising sending a notification, by the at least one processor, to the user device of the at least one user of missing training requirements upon a determination that the at least one user is missing at least one training requirement.

14. The computer system of claim 9, wherein determining that the incoming data is indicative of the occurrence of at least one quality event in the monitored area is performed by a processor in the user device.

15. The computer system of claim 9, wherein determining that the incoming data is indicative of the occurrence of at least one quality event in the monitored area comprises assigning the incoming data a numerical value, and comparing the numerical value to a threshold value.

16. The computer system of claim 9, wherein the user device is a mobile device with a dedicated mobile application on the mobile device, and the quality event form is transmitted to the mobile application on the mobile device.

17. A non-transitory computer-readable medium containing instructions for automatically triggering a quality event filing in a monitored area, the non-transitory computer-readable medium storing instructions that, when executed by at least one processor, configure the at least one processor to perform:
receiving, by the at least one processor, incoming data from a plurality of connected devices in the monitored area, the incoming data including environmental data of the monitored area and user data of at least one user in the monitored area;
determining, by the at least one processor, whether the incoming data is indicative of an occurrence of at least one quality event in the monitored area by referencing the incoming data with parameters stored in a database;
upon a determination that the incoming data is indicative of the occurrence of at least one quality event, generating, by the at least one processor, a quality event form with one or more sections that correspond to the incoming data pre-filled, and transmitting the quality event form to a graphical user interface of a user device of the at least one user in the monitored area;
receiving, by the at least one processor, an updated quality event form from the user device, the updated quality event form including the user data of the at least one user in the monitored area; and transmitting, by the at least one processor, the updated quality event form to the database.

18. The non-transitory computer-readable medium of claim 17, wherein the at least one processor is further configured to perform:
determining whether the at least one user in the monitored area has permission and authorization to receive the environmental data of the monitored area;

upon a determination that the at least one user has permission and authorization to receive the environmental data, periodically transmitting the environmental data from the connected devices to the graphical user interface of the user device of the at least one user; and upon the determination that the incoming data is indicative of at least one quality event transmitting the quality event form to a graphical user interface of the user device of the at least one user in the monitored area.

19. The non-transitory computer-readable medium of claim 17, wherein the user data includes training data of the at least one user in the monitored area, further comprising sending a notification to the user device of the at least one user of missing training requirements upon a determination that the at least one user is missing at least one training requirement.

20. The non-transitory computer-readable medium of claim 17, wherein determining that the incoming data is indicative of the occurrence of at least one quality event in the monitored area comprises assigning the incoming data a numerical value, and comparing the numerical value to a threshold value.

* * * * *